UNITED STATES PATENT OFFICE.

BYRON B. GOLDSMITH, OF NEW YORK, N. Y.

COMPOSITION OF MATTER.

1,152,625.   Specification of Letters Patent.   Patented Sept. 7, 1915.

No Drawing.   Application filed August 3, 1912.   Serial No. 713,028.

*To all whom it may concern:*

Be it known that I, BYRON B. GOLDSMITH, a citizen of the United States, residing at New York city, in the county of New York and State of New York, have invented certain new and useful Improvements in Composition of Matter; and I do hereby declare the following to be a full, clear, and exact description of the invention, such as will enable others skilled in the art to which it appertains to make and use the same.

My invention relates to a new composition of matter and process of making the same which can be used as a mass or in solution as a coating. The esters of cellulose, such as nitro-cellulose and cellulose acetate have been used mixed with other substances for many purposes. I have found that on treating oils, either drying or non-drying with nitric acid sufficiently dilute to oxidize the same without actual nitration the resulting product, when mixed with cellulose esters gives compounds of considerable value for certain purposes.

As a sample of the oils which I have found to answer my purpose, I would mention soy bean, cotton seed, olive, linseed, sperm, corn and castor. 200 cc. of the oil are heated on a water bath with 100 cc. of water and from 60 to 100 cc. of nitric acid of specific gravity 1.4. After a little while the oxid of nitrogen fumes escape with some foaming and the reaction is continued until it is completed. The excess of nitric acid is then neutralized or washed out and the resulting compound can be mixed with the cellulose ester. It mixes in almost any proportion with the same and dissolves in a great many of the same solvents. When mixing with cellulose-nitrate the ordinary amyl acetate solutions diluted with diluents, such as benzin or benzol, will be found to mix readily with the treated oils.

In the cellulose-acetate mixture the solution of cellulose-acetate in phenol and benzol is found to mix very well with the treated oil. It is advisable to make a solution of the treated oil before adding to it the cellulose ester.

The proportions of the oil which are used with the cellulose ester can be varied within very wide limits on account of the perfect agreement of the components, and the resulting compound will vary according to which is used in excess.

With some oils my process is accompanied by formation of elaidin.

I am aware that it has been proposed to subject oils to a process of nitration by treatment with concentrated nitric acid, and to mix the resulting product with nitrocellulose. My invention differs radically from this earlier process, and I secure a different product, in that I employ dilute nitric acid, whereby oxidation of the oil is accomplished without nitration thereof.

The nitro-cellulose which I use is the soluble variety used for plastic masses and solutions.

What I claim is:—

1. The process of producing a composition of matter which consists in subjecting a vegetable oil to the action of nitric acid sufficiently dilute to oxidize the same without nitration and mixing the resulting product with an ester of cellulose.

2. The process of producing a composition of matter which consists in subjecting a vegetable oil to the action of nitric acid sufficiently dilute to oxidize the same without nitration while heating the same and mixing the resulting product with an ester of cellulose.

3. The process of producing a composition of matter which consists in subjecting a vegetable oil to the action of nitric acid sufficiently dilute to oxidize the same without nitration and mixing the same with an ester of cellulose and a suitable solvent.

4. The process of producing a composition of matter which consists in subjecting a vegetable oil to the action of nitric acid sufficiently dilute to oxidize the same without nitration and mixing the same with nitrocellulose.

5. The process of producing a composition of matter which consists in subjecting a vegetable oil to the action of nitric acid sufficiently dilute to oxidize the same without nitration, making a suitable solution of the resulting product and mixing it with a cellulose ester.

6. The process of producing a composition of matter which consists in subjecting a vegetable oil to the action of nitric acid sufficiently dilute to oxidize the same without nitration in the presence of heat, continuing the reaction until completed, and mixing the resulting product with a cellulose ester.

7. The process of producing a composition of matter which consists in subjecting a vegetable oil to the action of nitric acid of not more than about fifty per cent. strength, while heating the same, continuing the reaction until completed and mixing the resulting product with an ester of cellulose.

8. The process of producing a composition of matter which consists in subjecting a vegetable oil to the action of nitric acid of not more than about fifty per cent. strength, while heating the same, continuing the reaction until completed and mixing the resulting product with nitro-cellulose.

9. A composition of matter containing an ester of cellulose mixed with a vegetable oil modified by treatment with nitric acid sufficiently dilute to oxidize the same without nitration.

10. A composition of matter containing an ester of cellulose mixed with a vegetable oil modified by treatment with nitric acid sufficiently dilute to oxidize the same without nitration, and with a suitable solvent.

11. A composition of matter containing an ester of cellulose mixed with soy bean oil modified by treatment with nitric acid sufficiently dilute to oxidize the same without nitration.

12. A flexible, amorphous composition of matter containing nitro-cellulose mixed with a vegetable oil modified by treatment with nitric acid sufficiently dilute to oxidize the same without nitration.

13. A flexible, amorphous composition of matter containing nitro-cellulose mixed with soy bean oil modified by treatment with nitric acid sufficiently dilute to oxidize the same without nitration.

14. A flexible, amorphous composition of matter containing nitro-cellulose mixed with a vegetable oil modified by treatment with nitric acid sufficiently dilute to oxidize the same without nitration and with a suitable solvent.

In testimony whereof, I affix my signature, in presence of two witnesses.

BYRON B. GOLDSMITH.

Witnesses:
H. S. MACKAYE,
KATHARINE C. MEAD.